(12) United States Patent
Kaipu et al.

(10) Patent No.: US 10,791,102 B2
(45) Date of Patent: *Sep. 29, 2020

(54) SEARCHING CONTENT ASSOCIATED WITH MULTIPLE APPLICATIONS

(71) Applicant: AirWatch LLC, Atlanta, GA (US)

(72) Inventors: Sandeep Naga Kaipu, Atlanta, GA (US); Subham Kumar Tyagi, Bangalore (IN); Anantha Raman B R, Bangalore (IN); Joel Sequeira, Atlanta, GA (US); Vivek Ratilal Vekariya, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/157,205

(22) Filed: Oct. 11, 2018

(65) Prior Publication Data

US 2019/0044928 A1  Feb. 7, 2019

Related U.S. Application Data

(63) Continuation of application No. 14/968,914, filed on Dec. 15, 2015, now Pat. No. 10,104,051.

(30) Foreign Application Priority Data

Oct. 27, 2015 (IN) .......................... 5762/CHE/2015

(51) Int. Cl.
*G06F 21/00* (2013.01)
*H04L 29/06* (2006.01)
*G06F 16/14* (2019.01)

(52) U.S. Cl.
CPC .............. *H04L 63/06* (2013.01); *G06F 16/14* (2019.01); *H04L 63/0823* (2013.01); *H04L 63/102* (2013.01); *H04L 63/123* (2013.01)

(58) Field of Classification Search
CPC ............................. G06F 21/30; H04L 2209/64
See application file for complete search history.

(56) References Cited

U.S. PATENT DOCUMENTS

| | | | |
|---|---|---|---|
| 6,775,783 B1* | 8/2004 | Trostle | G06F 21/335 713/185 |
| 8,959,087 B2 | 2/2015 | Joshi et al. | |
| 2002/0147793 A1* | 10/2002 | Ooishi | G06F 16/951 709/219 |
| 2005/0091269 A1* | 4/2005 | Gerber | G06F 9/44505 |

(Continued)

OTHER PUBLICATIONS

Office Action dated Apr. 25, 2017 for U.S. Appl. No. 14/834,440.

*Primary Examiner* — Izunna Okeke
(74) *Attorney, Agent, or Firm* — Thomas | Horstemeyer, LLP

(57) ABSTRACT

Disclosed are examples of searching for content associated with multiple applications. In various examples, a first application can obtain a search query and maintain a list of applications available to provide content. The first application can send a request to a second application identified in the list, the request including a key that indicates the first application is authorized to request the second application to search for content. The first application can obtain a search result from the second application based on the request and present the search result in a user interface in the first application.

20 Claims, 6 Drawing Sheets

(56) References Cited

U.S. PATENT DOCUMENTS

| | | |
|---|---|---|
| 2005/0289109 A1 | 12/2005 | Arrouye et al. |
| 2005/0289644 A1 | 12/2005 | Wray |
| 2006/0168222 A1* | 7/2006 | Saxena ................ H04N 7/165 709/225 |
| 2007/0150446 A1* | 6/2007 | Gurevich ............... G06F 16/28 |
| 2008/0222108 A1 | 9/2008 | Prahlad et al. |
| 2011/0131419 A1 | 6/2011 | Dowds et al. |
| 2012/0124035 A1 | 5/2012 | Vaidyanathan et al. |
| 2012/0124072 A1 | 5/2012 | Vaidyanathan et al. |
| 2012/0124519 A1 | 5/2012 | Uphoff et al. |
| 2012/0131683 A1 | 5/2012 | Nassar et al. |
| 2015/0026212 A1 | 1/2015 | Fink et al. |
| 2015/0113092 A1 | 4/2015 | Chadha et al. |
| 2015/0317388 A1 | 11/2015 | Roh et al. |

* cited by examiner

SEARCHING CONTENT ASSOCIATED WITH MULTIPLE APPLICATIONS

CROSS-REFERENCE TO RELATED APPLICATIONS

This application is a continuation of and claims priority to application Ser. No. 14/968,914, filed on Dec. 15, 2015 and titled "SEARCHING CONTENT ASSOCIATED WITH MULTIPLE APPLICATIONS," which is incorporated by reference herein in its entirety.

BACKGROUND

Users of computing devices often use applications to process and store data files that can include various types of content. For example, a user can use a word processing application to create, edit, and store word processing documents. When the user wants to view or edit the content in the word processing document, the user can operate the word processing application to open the file and render the content.

Over time, a user can store a large quantity of files. Eventually, it can become difficult for the user to locate a particular file due to the large quantity of files that a user can accumulate. In addition, it is common for multiple users to store files in the same storage system so that each user has access to all of the files in the storage system. However, the number of files stored by the multiple users can make it difficult for one user to find and access a particular file.

Search engines can facilitate a user finding files that match search queries. However, search engines often do not have the ability to search for content that is restricted from access for various reasons.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the searching of content associated with applications in a client device. According to various examples, a search requester component of an application can request other applications in the client device to perform a search for content that matches a particular search query. After verifying that the application is authorized to request the search, search provider components in the other applications can search for content that matches the search query and provide the search requester with search results. Once the application receives the search results from the search providers, the application can render the search results in a user interface.

In the following discussion, examples of systems and their components are described, followed by examples of the operation of those systems.

Figure 1:
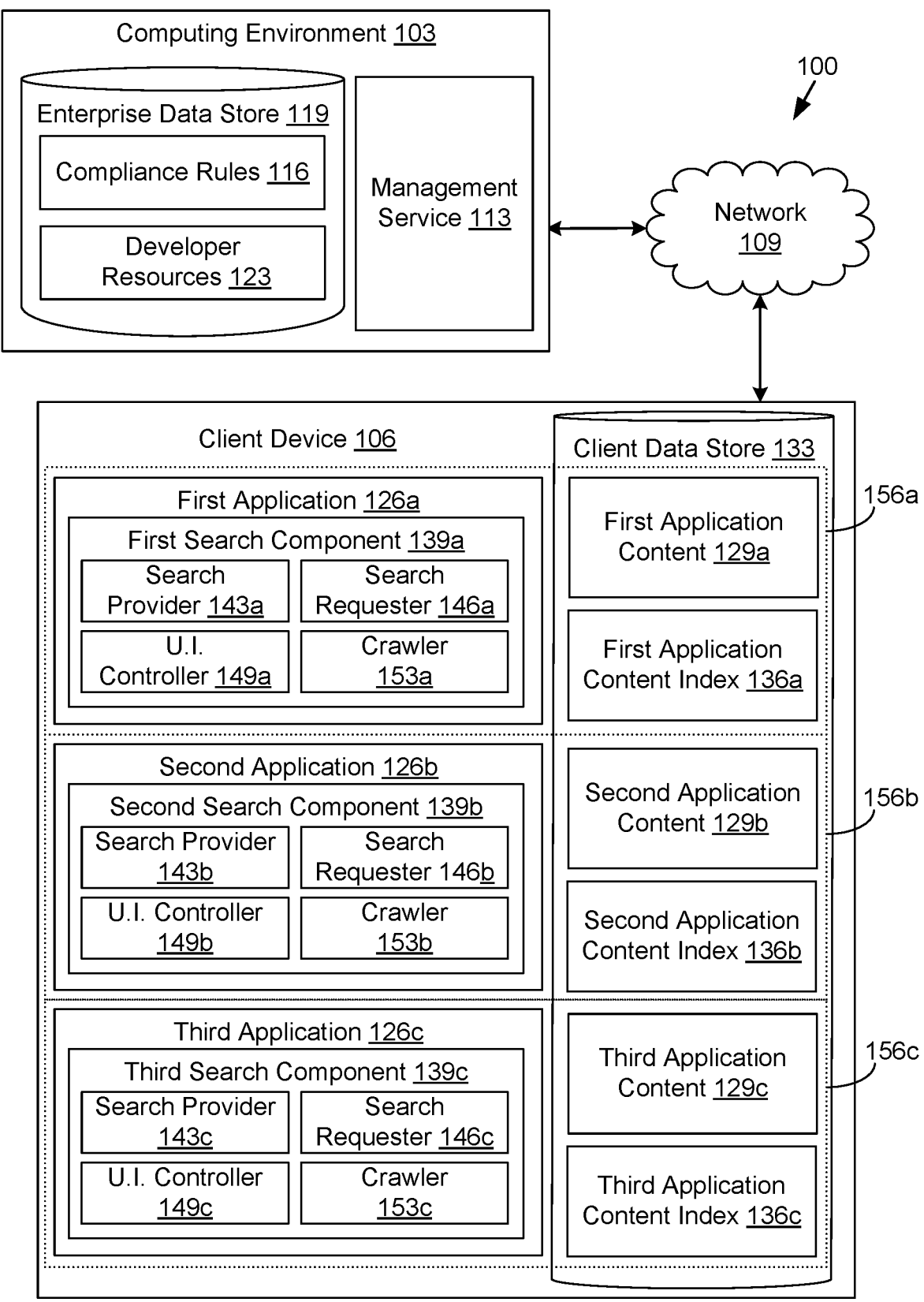
FIG. 1 is a drawing of an example of a networked environment.

With reference to FIG. 1, shown is an example of a networked environment 100. The networked environment 100 can include a computing environment 103 and a client device 106 in data communication through a network 109. The network 109 can include the Internet, one or more intranets, extranets, wide area networks (WANs), local area networks (LANs), wired networks, wireless networks, or any combination of two or more such networks. The network 109 can include satellite networks, cable networks, Ethernet networks, cellular networks, and telephony networks.

The computing environment 103 can be a computing environment operated by one or more enterprises, such as a business or other organization. The computing environment 103 can include a computing device, such as a server computer, that can provide computing capabilities. Alternatively, the computing environment 103 can include multiple computing devices arranged in one or more server banks or computer banks. For examples in which the computing environment 103 includes multiple computing devices, the computing devices can be located in a single installation, or the computing devices can be distributed among multiple different geographical locations.

In some examples, the computing environment 103 can include computing devices that together form a hosted computing resource or a grid computing resource. In other examples, the computing environment 103 can operate as an elastic computing resource for which the allotted capacity of computing-related resources, such as processing resources, network resources, and storage resources, can vary over time. In other examples, the computing environment 103 can include or be operated as one or more virtualized computer instances that can be executed in order to perform the functionality that is described herein.

The computing environment 103 can include various systems. For example, the computing environment 103 can include a management service 113 that can monitor and manage the operation of client devices 106 associated with the enterprise that operates the computing environment 103. In some examples, the management service 113 can manage and oversee the operation of multiple client devices 106 enrolled in a mobile device management service that is provided by the management service 113. The management service 113 can also provide the client devices 106 with access to email, calendar data, contact information, and other resources associated with the enterprise.

The management service 113 can assign various compliance rules 116 to respective client devices 106. The compliance rules 116 can specify, for example, one or more conditions that must be satisfied for a respective client device 106 to be deemed compliant with the compliance rule. In one example, a compliance rule 116 can specify that particular applications are prohibited from being installed in a client device 106. In another example, a compliance rule 116 can specify that a lock screen is required to be generated when the client device 106 is "awoken" from a low power "sleep" state and that a passcode is required for a user to unlock the lock screen. Some compliance rules 116 can be based on time, geographical location, or network properties. For instance, a client device 106 can satisfy a compliance rule 116 when a client device 106 is located within a particular geographic location.

A client device 106 can satisfy a compliance rule 116 in another example when the client device 106 is in communication with a particular network 109, such as a particular local area network that is managed by the computing environment 103. Furthermore, a compliance rule 116 in another example can be satisfied upon the time and date matching specified values.

Another example of a compliance rule 116 involves whether a user belongs to a particular group of authorized users. A compliance rule 116 can include a whitelist or a blacklist that specifies whether particular users or groups of users are authorized users. In various examples, the computing environment 103, the client device 106, or a combination of both the computing environment 103 and the client device 106 can determine whether a client device 106 satisfies a compliance rule 116.

In some examples, an enterprise can operate the management service 113 to ensure that the client devices 106 of its users satisfy respective compliance rules 116. By ensuring that the client devices 106 of its users are operating in compliance with the compliance rules 116, the enterprise can control access to resources to thereby improve the security of devices associated with the enterprise and the users of the client devices 106.

The computing environment 103 can also include an enterprise data store 119. The enterprise data store 119 can be representative of multiple enterprise data stores 119 accessible by components in the computing environment 103. The enterprise data store 119 can store various data associated with the computing environment 103. For example, the enterprise data store 119 can store the compliance rules 116 that the management service 113 has assigned to the respective client devices 106.

The enterprise data store 119 can also store developer resources 123. A developer resource 123 can be a resource that the management service 113 provides to developers, including third party developers, that can create and manage applications for client devices 106. Developer resources 123 can include libraries, such as security libraries and search libraries, that developers can incorporate into applications.

Developers can incorporate libraries into applications in various ways. For some examples, the management service 113 can provide a software development kit (SDK) to developers. Using the SDK, application developers can modify the source code of their applications to include the security libraries that are provided by the SDK.

In another approach, developers or the management service 113 can incorporate libraries into applications through a process known as "wrapping." To wrap an application, the developer or management service 113 can decompile the application and then insert the libraries into the decompiled application. The developer or management service 113 can then compile the application with the added security libraries.

When a library is incorporated into an application using, for example, the SDK or application wrapping approaches described above, the functionality provided by the library can be invoked by the application when the application is executed in a client device 106. For example, if a security library provides functionality involving the ability to monitor activity in a client device 106 and enforce compliance rules 116, the application can call functions provided by the library to implement the activity monitoring and compliance rule 116 enforcement.

The client device 106 is representative of multiple client devices 106 that can be coupled to the network 109. The client device 106 can include a processor-based computer system, such as a desktop computer, a laptop computer, a personal digital assistant, a mobile phone, or a tablet computer. The client device 106 can include output devices, such as a display and audio speakers, as well as one or more input devices, such as a mouse, keyboard, touch pad, or touch screen, which can facilitate a user interacting with and controlling the client device 106.

The client device 106 can also include a first application 126*a*, a second application 126*b*, and a third application 126*c* (collectively, the "applications 126"). Although the example depicted in FIG. 1 includes three applications 126, alternative examples can include fewer or greater numbers of applications 126. Each application 126 can include a set of computer programs that can perform various functionality. As one example, the first application 126*a* can include a word processing application, the second application 126*b* can include a media player that can render multimedia, and the third application 126*c* can include an email client that can send and receive email messages. The applications 126 can be secured applications. In this regard, enterprise security libraries can be included in the applications 126, and the management service 113 can monitor and control the applications 126. For example, an application 126 can call functions provided by the security library to monitor or control activity associated with the application 126. In addition, the applications 126 can be signed with the same certificate key, which can facilitate interaction of the applications 126 with each other, as will be described in further detail below. Signing an application 126 with a certificate key can ensure that the application 126 has been developed by a trusted developer.

The applications 126 can be associated with first application content 129*a*, second application content 129*b*, and third application content 129*c* (collectively, the "application content 129") that is stored in a client data store 133. The application content 129 can include files and other types of data that the corresponding application 126 can access and process. The first application 126*a* can access and process the first application content 129*a*, the second application 126*b* can access and process the second application content 129*b*, and the third application 126*c* can access and process the third application content 129*c*.

The application content 129 can be associated with corresponding application content indexes 136*a*-136*c* (collectively, the "application content indexes 136"). The application content indexes 136*a* can be regarded as search indexes that components can search to identify application content 129 that matches to a particular search query. By including the application content indexes 136, searches can be performed faster than if the actual application content 129 were searched instead.

The applications 126 can include various components. For example, the applications 126 can include corresponding search components 139*a*-139*c* (collectively, the "search components 139"). In some examples, developers can incorporate the search components 139 into applications 126 using an SDK or wrapping process, as described above. As will be described in further detail below, the search components 139 can facilitate a search for application content 129 being performed across multiple applications 126. To this end, the search components 139 can include corresponding search providers 143*a*-143*c* (collectively, the "search providers 143") and search requesters 146*a*-146*c* (collectively, the "search requesters 146"). The search requester 146 of a particular application 126 can communicate with the search provider 143 of other applications 126. The search requester 146 can also request the search providers of other applications 126 to provide search results in response to search queries. As will be described in further detail below, the search providers 143 can receive search requests, generate corresponding search results, and provide the search results to the search requester 146 that requested the search.

The search components 139 can also include corresponding user interface controllers 149a-149c (collectively, the "user interface controllers 149") and crawlers 153a-153c (collectively, the "crawlers 153"). The user interface controllers 149 can generate and control user interfaces for the corresponding application 126 to facilitate a user inputting search queries. The user interface controllers 149 can also render search results in user interfaces.

The crawlers 153 can parse application content 129 and update the application content indexes 136. In some examples, a crawler 153 can periodically parse the application content 129 and update the application content indexes 136. In other examples, the crawlers 153 can parse and update an application content index 136 in response to various triggers. For example, a trigger can be the current time matching a specified time. As another example, a trigger can be the detection of new application content 129 being stored in the client data store 133.

The client device 106 can also include an operating system that can create sandboxes 156a-156c (collectively, the sandboxes 156) for the respective applications 126. The sandboxes 156 can be regarded as being virtual containers for the respective applications 126 and associated resources. The sandboxes 156 can isolate resources, such as code and the application content 129, for the respective applications 126. For example, the sandbox 156a can isolate the first application content 129a so that only the first application 126a can retrieve the first application content 129a from the client data store 133. Accordingly, the first application 126a can access the first application content 129a from the client data store 133, but the second application 126b, and the third application 126c cannot retrieve the first application content 129a from the client data store 133.

The operating system can also restrict the transfer of at least some types of data between components in the client device 106 based on various protection models. In some examples, the operating system can enforce a signature-based protection model. If a component is protected using the signature-based protection model, the operating system can allow the component to transfer data to only other components that are signed with the same certificate key. Thus, if a component subject to the signature-based protection model is signed with a certificate key that differs from another component, the operating system of the client device 106 can prohibit the component from sharing at least some data with the other component. In some examples, the applications 126 are signed with the same certificate key. Accordingly, the operating system can allow the applications 126 to transfer data, such as application content 129, between each other.

Next, examples of the operation of the networked environment 100 are described. To begin, the applications 126 installed in the client device 106 can maintain a list of the other applications 126 that are installed in the client device 106. To this end, in some examples, when an application 126 is installed in the client device 106, the newly installed application 126 can broadcast messages to the other applications 126 notifying the other applications 126 of the installation. Similarly, when an application 126 is being uninstalled in the client device 106, the application 126 being uninstalled can broadcast messages to the other applications 126 notifying the other applications 126 of the uninstallation. In alternative examples, the management service 113 can monitor the applications 126 being installed or uninstalled in the client device 106 and notify the applications 126 installed in the client device 106 when an additional application 126 is installed or when an existing application 126 is uninstalled. Thus, the applications 126 can store a list of other applications 126 that are in the client device 106.

As the client device 106 operates, the applications 126 can store various application content 129 in the client data store 133. For example, the first application 126a can store first application content 129a that includes word processing documents, the second application 126b can store second application content 129b that includes multimedia files, and the third application 126c can store third application content 129c that includes email messages. The application content 129 can be stored in the client data store 133 and isolated from various components in the client device 106 by virtue of the sandboxes 156 that are established by the operating system.

From time to time, the crawlers 153 of the search components 139 can parse the stored application content 129 to populate and update the respective application content indexes 136. In some examples, the crawlers 153 can begin this process periodically. In other examples, the crawlers 153 can populate and update the application content indexes 136 in response to various triggers, such as a new file being stored in the client data store 133. Accordingly, the crawlers 153 can generate and maintain the application content indexes 136, which can include entries that represent the corresponding application content 129.

As will now be discussed, the search components 139 of the applications 126 can be used to perform searches across the application content 129 of the multiple applications 126 installed in the client device 106. In the following discussion, the first application 126a is being used to initiate a search, and the second application 126b and third application 126c provide the first application 126a with search results. However, in alternative examples, the second application 126b or third application 126c can initiate a search and receive search results from the other applications 126 using the techniques described below.

To facilitate initiating a search, the user interface controller 149a of the first application 126a can generate user interface element, such as a text input box, that the user of the client device 106 can use to input a search query. The search query can include a text string in various examples. For instance, the user can input the text string of "accounting records" to search for information corresponding to accounting records that are associated with the applications 126.

In some examples, the user interface controller 149a can include a user interface element that facilitates the user selecting particular categories of application content 129 and particular data fields to be searched. To this end, when an application 126 is installed in the client device 106, the newly installed application 126 or the management service 113 can notify the other applications 126 already installed in the client device 106 of the particular data fields that are searchable with respect to the corresponding application content 129. For instance, an email application 126 can notify other applications 126 that the email application 126 can search data fields specifying the sender of an email, the intended recipients of the email, the subject of an email, and various time stamps associated with the email. By the user interface controller 149a providing a user interface element for the user to select particular categories of application content 129 or particular data fields to be searched, a user can limit the scope of a search.

Once a user has input a search query into the user interface generated by the user interface controller 149a, the first search component 139a can provide the search query to the search requester 146a. Upon receiving the search query, the search requester 146a can request the search components 139b-139c of the second application 126b and the third application 126c to search for second application content 129b and third application content 129c, respectively, that matches the search query. In some examples, the first search component 139a can consult the list of installed applications 126 to identify the particular applications 126 the first search component 139a should send a search request.

To request the search components 139b-139c to perform the search, the search requester 146a can generate messages for the second application 126b and the third application 126c that make the requests. In particular, the messages for the second application 126b and the third application 126c can include payload data that represents the search query input by the user, the identity of the first application 126a, a communication key that can indicate that the first application 126a is authorized to request the search, the time the search is being requested, and the number of times the search has been requested by the first application 126a. After the search requester 146a has generated the messages, the search requester 146a can provide the generated messages to the second search component 139b and the third search component 139c, respectively, using an interprocess communication service provided by the operating system of the client device 106.

When the second application 126b receives the message from the search requester 146a, the second application 126b can extract the payload data and parse the contents of the payload data. In some examples, the second application 126b can determine whether the received message includes a communication key indicating that the first application 126a is authorized to communicate with the second application 126b and request the second application 126b to perform searches. In various embodiments, the second application 126b can compare the received communication key with a stored value to determine whether the communication key is authentic. In other examples, the second application 126b can request the management service 113 to determine whether the received communication key is authentic. If the communication key is not authentic, or if no communication key was received in the message, the second application 126b can conclude that the message is from an unauthorized application and discard the message.

If the second application 126b determines that the communication key is authentic, the second application 126b can parse the payload of the received message to determine whether the message includes a request for a search to be performed. If the payload includes a request to perform a search, the second application 126b can provide the extracted data to the search provider 143b of the second search component 139b. In some examples, the second application 126b can determine whether to comply with the search. For example, the management service 113 or a user setting can instruct to second application 126b to deny a search if a particular compliance rule 116 is not satisfied.

If the second application 126b determines to allow a search to be performed, the search provider 143b can extract the data representing the search query input by the user and perform a search based on the search query. In some examples, the search provider 143b can search the second application content index 136b to determine whether entries in the second application content index 136b match the search query. In other examples, the search provider 143b can search the second application content 129b itself, including file names and metadata, to determine whether the content matches the search query. The search provider 143b can perform search algorithms that search for synonyms and terms related to the search query.

If the search of the second application content 129b or the second application content index 136b indicates that files or other resources in the second application content 129b match the search query, the search provider 143b can collect information regarding the resources. For example, the search provider 143b can include the name of the resource, a description of the resource, the storage location of the resource, the creator of the resource, and names of users who have accessed the resource. As will be described below, the search provider 143b can provide this information to the search requester 146a of the first application 126a.

When the search provider 143a has finished searching the second application content index 136b or the second application content 129b, the search provider 143b can generate a message that represents the search results. In various examples, a search result can specify information associated with a resource that matches the search query, such as the name, a description, the storage location, the creator, and names of users who have accessed the resource. If no resources matched the search query, a search result can indicate that there were no resources in the second application content 129b that match the search query.

The message that contains the search results can also include other information associated with the second application 126b and the second application content 129b. For example, the message can identify the second application 126b so that the search requester 146a of the first application 126a can determine the source of the search results. In addition, the message can include a communication key that indicates that the second application 126b is authorized to communicate with the first application 126a. The message that contains the search results and potentially other information can be formatted in various ways. For instance, the message can be an extensible markup language (XML) file. In other examples, the message can be a JavaScript object notation (JSON) data object.

Once the search provider 143b of the second application 126b has generated the message containing the search results and potentially other information, the search provider 143b can provide the message to the search requester 146a of the first application 126a. To this end, the search provider 143b can use an interprocess communication service provided by the operating system of the client device 106.

As described above, the search requester 146a of the first application 126a can also send a message to the third application 126c requesting the third search component 139c to search for third application content 129c that match the search query. The search provider 143c can perform a search and provide a message to the search requester 146a of the first application 126a using the techniques described above. In some examples, the search provider 143c of the third application 126c can perform its search at the same time that the search provider 143b of the second application 126b performs its search. By the search providers 143b-143c performing their searches in parallel, the net time it takes to perform the searches may be less than if the searches were otherwise performed sequentially.

In addition to the search requester 146a of the first application 126a requesting the search providers 143b-143c of the second application 126b and the third application 126c to provide search results, the search requester 146a of the first application 126a can also request the search provider 143a of the first application 126a to search for first application content 129a that matches the search query. The search provider 143a can then search the first application content index 136a or the actual first application content 129a and generate search results using the techniques described above. The search provider 143 can then provide the search results to the search requested 146a without using an interprocess communication service provided by the operating system of the client device 106.

Thus, as described above, the search requester 146a of the first application 126a can request the search providers 143 of the applications 126 to search for application content 129 that matches a search query that a user provided using the first application 126a. Responsive to the requests, the search providers 143 can provide their respective search results.

Once the search requester 146a obtains the search results from the search providers 143, the search requester 146a can provide the search results to the user interface controller 149a of the first application 126a, and the user interface controller 149a can render the search results in a user interface for the first application 126a. The way in which the user interface controller 149a presents the search results can vary according to various examples. In some examples, the user interface controller 149a can order and present the rendered search results based on relevancy metrics. In another example, the user interface controller 149a can group and present the rendered search results based on the identity of the application 126 that provided the respective search results. For example, search results from the first application 126a can be presented in a first group, search results from the second application 126b can be presented in a second group, and search results from the third application 126c can be presented in a third group.

The user interface controller 149a can also generate a user interface element that can facilitate a user of the client device 106 filtering or rearranging the rendered search results. For example, the user can specify that only search results from a particular application 126 should be rendered. As another example, the user can specify that the search results from a particular application 126 should be presented first in a user interface. In other examples, the user can filter search results based on various fields, such as fields specifying the type of application content 129 or creator of the application content 129.

In some examples, the user interface controller 149a can include a user interface element that facilitates the user selecting whether to hide or not retrieve search results for application content 129 that is inaccessible due to a compliance rule 116 not being satisfied. In these examples, the applications 126 providing the search results can evaluate whether applicable compliance rules 116 are satisfied so that the corresponding application content 129 is accessible to the user. If an application determines that the application content 129 corresponding to a particular search result is not accessible, the user interface controller 149a can omit the search result from the search results presented in a user interface. In other examples, the search providers 143 can provide search results to the search requester 146a for only application content 136 that is accessible to the user.

When search results are rendered in a user interface, the user of the client device 106 can select a search result, and the user interface controller 149a can perform various actions in response to the selection. In one example, the user interface controller 149a can instruct the first application 126a to retrieve and open the application content 129 that corresponds to the selected search result. In other examples, the user interface controller 149a can identify the application 126 that provided the selected search result and instruct the identified application 126 to retrieve and open the application content 129 that corresponds to the selected search result. In addition, the user interface controller 149a can cause the identified application 126 to become the primary active application 126 in the client device 106, so that the user does not have to manually cause the application 126 to become active. In another example, when the user selects a search result, the user interface controller 149 can designate the selected search result as a favorite search result and assign the search result to a list of favorite search results for later retrieval. In some examples, the user can request that the first search component 139a forward the search result to another client device 106.

The particular actions that the user interface controller 149a can perform with respect to search results can be specified by the applications 126 that provided the search results. For example, the search provider 143 of an application 126 that provides a search result can indicate actions that the operating system of the client device 106 can perform with respect to the search result as well as actions that the application 126 or other applications 126 can provide with respect to the search result. In some examples, the when a search requester 146 requests the search providers 143 to provide search results, the search requester 146 can also request the search providers 143 to specify the actions that the operating system and the applications 126 can perform with respect to the search result. In other examples, the search providers 143 can provide this information without an explicit request from the search requester 146. For example, a search provider 143 can specify that the operating system can cause a user interface for a particular application 126 to become the active foreground user interface so that application content 129 corresponding to a search result can be rendered in the user interface and presented to the user. As another example, the search provider 143 can specify that one or more particular applications 126 are capable of sharing the application content 129 corresponding to the search result to another client device 106.

In some examples, the user interface controller 149a can render a list of options of actions that the user interface controller 149a can take with respect to a search result. The user interface controller 149a can render the list of options in response to a user interacting with the user interface in various ways. For instance, the user can press and hold a finger on a touchscreen over a rendering of a search result to prompt the user interface controller 149a to display a list of actions that the user interface controller 149a can perform with respect to the search result. In another example, the user interface controller 149a can display the list of actions in response to a user performing a swipe gesture is association with the rendering of the search result.

Figure 2:
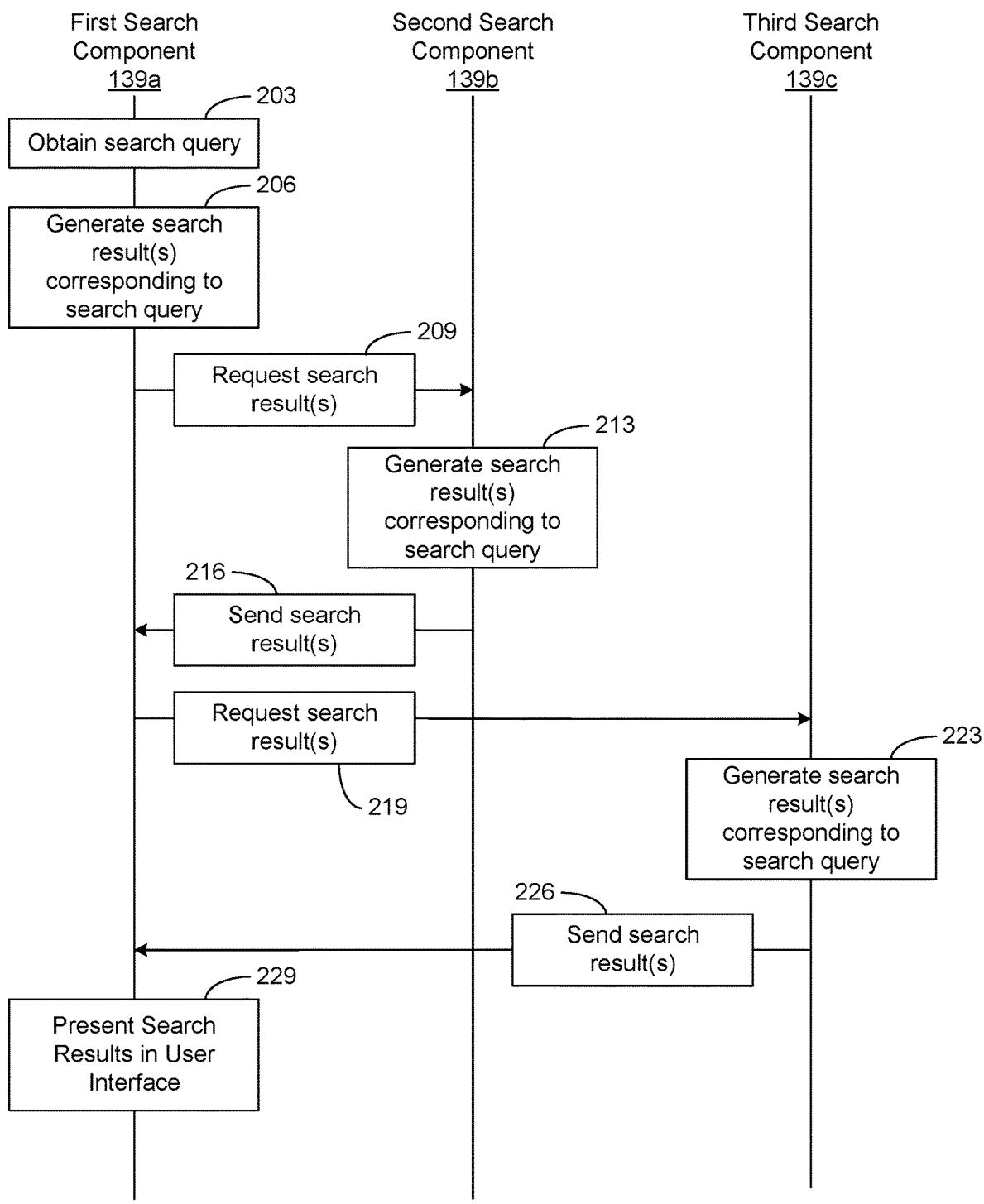
FIG. 2 is a sequence diagram illustrating an example of component interaction.

With reference to FIG. 2, shown is a sequence diagram illustrating an example of interactions of components in the networked environment 100. The sequence diagram of FIG. 2 illustrates an example of the first search component 139a of the first application 126a obtaining search results that correspond to a search query and presenting the search results in a user interface.

Beginning with step 203, the first search component 139a can obtain a search query. In some examples, the user interface controller 149a can generate a user interface element, such as text box, that can facilitate a user of the client device 106 inputting the search query. The search query can include a text string in various examples. In addition, the user in some examples can select the particular applications 126 or categories of application content 129 for which the first search component 139a can initiate a search.

The first search component 139a can then move to step 206 and generate search results that match the search query. To this end, the search requester 146a of the first search component 139a can provide the search query to the search provider 143a of the first search component 139a. The search provider 143a can then search the first application content 129a or the first application content index 136a for resources that match the search query. The search provider 143a of the first search component 139a can return a list of search results to the search requester 146a of the first search component 139a in the form of an XML file or JSON data object in various examples.

As shown at step 209, the first search component 139a of the first application 126a can send a request for search results to the second search component 139b of the second application 126b. In various embodiments, the search message can include payload data that represents the search query input by the user, the identity of the first application 126a, a communication key that can indicate that the first application 126a is authorized to request the search, the time the search is being requested, and the number of times the search has been requested by the first application 126a.

At step 213, the second search component 139b can generate search results representing second application content 129b that matches the search query. It is noted that, in some examples, the second search component 139b can generate the search results at the same time that the first search component 139a and the second search component 139b generate their search results at steps 206 and 213. To generate the search results, the search provider 143c of the second search component 139b can search the second application content 129b or the second application content index 136b for resources that match the search query. The second search component 139b can then move to step 216 and send the generated search results to the first search component 139a of the first application 126a. The second search component 139b can use an interprocess communication service provided by the operating system of the client device 106 to send search results in the form of an XML file or JSON data object in various examples.

As shown at step 219, the first search component 139a of the first application 126a can send a request for search results to the third search component 139c of the third application 126c. In various embodiments, the search request can include payload data that represents the search query input by the user, the identity of the first application 126a, a communication key that can indicate that the first application 126a is authorized to request the search, the time the search is being requested, and the number of times the search has been requested by the first application 126a.

At step 223, the third search component 139c can generate search results that represent third application content 129c that matches the search query. It is noted that, in some examples, the third search component 139c can generate the search results at the same time that the first search component 139a and the second search component 139b generate their search results at steps 206 and 213. To generate the search results, the search provider 143c of the third search component 139c can search the third application content 129c or the third application content index 136c for resources that match the search query. The third search component 139c can then move to step 226 and send the generated search results to the first search component 139a of the first application 126a. The third search component 139c can use an interprocess communication service provided by the operating system of the client device 106 to send search results in the form of an XML file or JSON data object.

At step 229, the first search component 139a can present the search results generated by the first search component 139a, the second search component 139b, and the third search component 139c in a user interface. In particular, the user interface controller 149a of the first search component 139a can render the search results. As described above, the user interface controller 149a can also order the search results based on relevancy metrics or group the search results based on the identities of the applications 126 that provided the respective search results. Thereafter, the process can end.

Figure 3A:
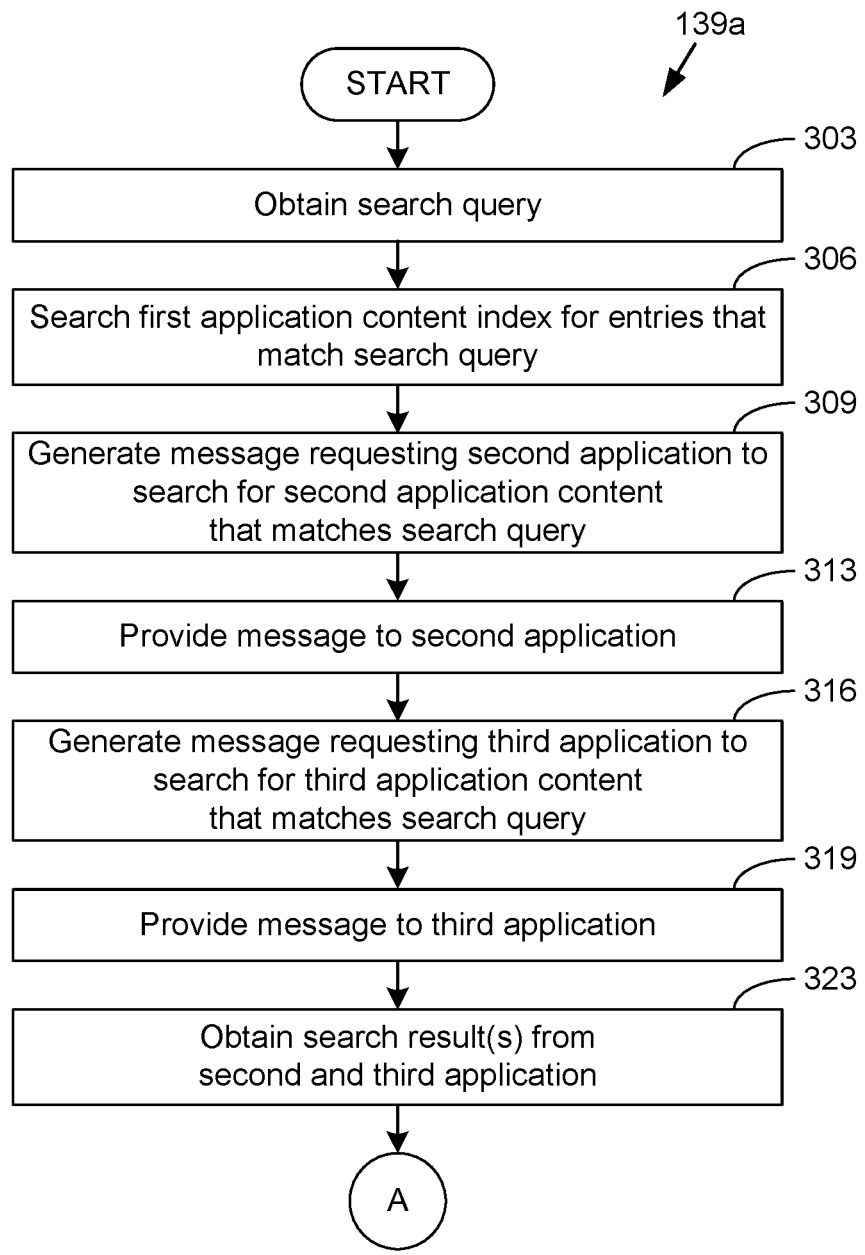
FIGS. 3A-3B, 4, and 5 are flowcharts illustrating examples of functionality implemented by search components in client devices.
Figure 3B:
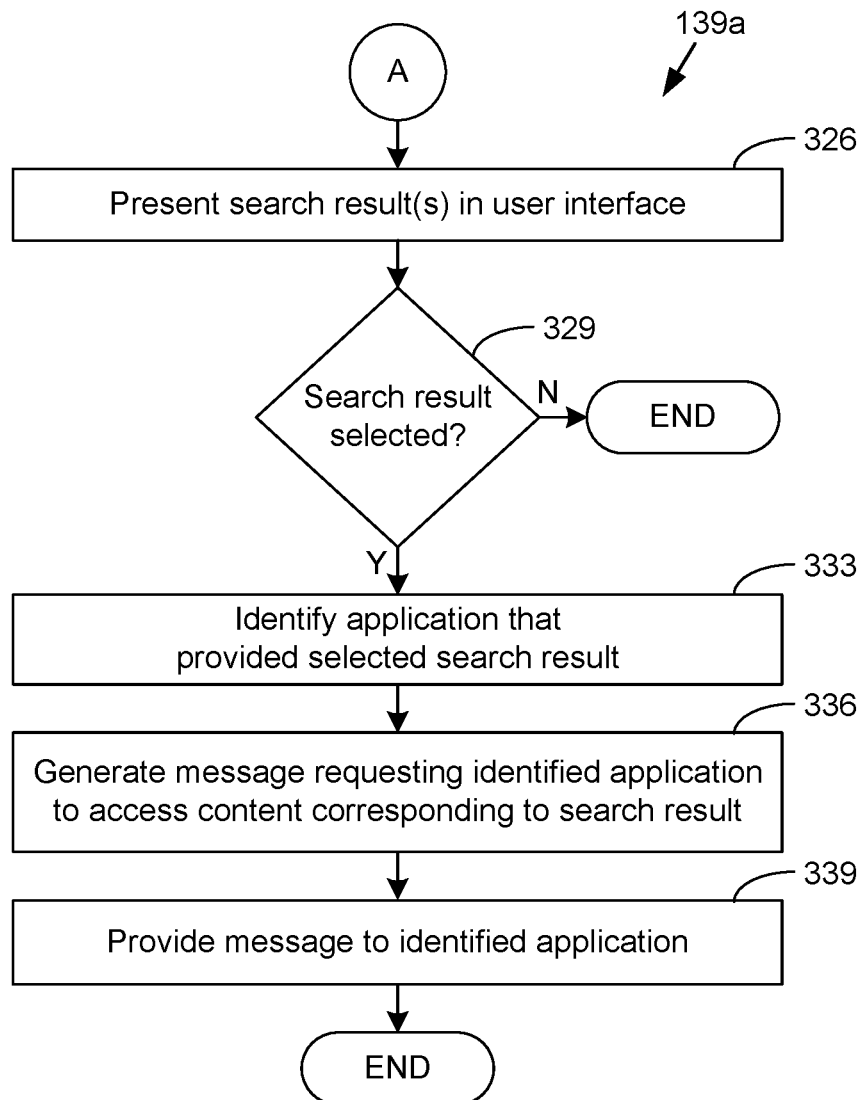

With reference to FIGS. 3A-3B, shown is a flowchart that provides an example of a portion of the operation of the first search component 139a. In particular, FIGS. 3A-3B provide an example of the first search component 139a obtaining search results associated with the first application 126a, the second application 126b, and the third application 126c. It is noted that the second search component 139b and the third search component 139c can operate in a similar manner as the first search component 139a. The flowchart of FIGS. 3A-3B can be viewed as depicting an example of a method implemented in the client device 106.

Beginning with step 303, the first search component 139a can obtain a search query. In various examples, the search query can include a text string that a user of the client device 106 has input into the client device 106. At step 306, the first search component 139a can search the first application content index 136a for entries that match the search query. For example, the first search component 139a can identify entries that relate to the search entry using search algorithms. In alternative embodiments, the first search component 139a can search the first application content 129a seeking to identify resources that match the search query.

At step 309, the first search component 139a can generate a message requesting the second application 126b to search for second application content 129b that matches the search query. As discussed above, the message generated by the first search component 139a can include payload data that represents the search query input by the user, the identity of the first application 126a, a communication key that can indicate that the first application 126a is authorized to request the search, the time the search is being requested, and the number of times the search has been requested by the first application 126a. As shown at step 313, the first search component 139a can then provide the generated message to the second application 126b. In some examples, the first search component 139a can use an interprocess communication service provided by the operating system to send the message to the second application 126b.

At step 316, the first search component 139a can generate a message requesting the third application 126c to search for third application content 129c that matches the search query. As discussed above, the message generated by the first search component 139a can include payload data that represents the search query input by the user, the identity of the first application 126a, a communication key that can indicate that the first application 126a is authorized to request the search, the time the search is being requested, and the number of times the search has been requested by the first application 126a. As shown at step 319, the first search component 139a can then provide the generated message to the third application 126c. In some examples, the first search component 139a can use an interprocess communication service provided by the operating system to send the message to the third application 126c.

As indicated at step 323, the first search component 139a can obtain search results from the second application 126b and the third application 126c. As described above, the search results can take the form of an XML file or a JSON data object in various examples.

As shown at step 326, which is in FIG. 3B, the first search component 139a can present the obtained search results in a user interface. As discussed above, the first search component 139a can also order the search components based on relevancy metrics or group the search results based on the particular application 126 to which the search result corresponds.

At step 329, the first search component 139a can determine whether a user of the client device 106 selected a search result that is presented in the user interface. If a search result was not selected, the process can end as shown. Otherwise, if the user did select a search result, the first search component 139a can identify the application 126 that provided the selected search result, as indicated at step 333. In some examples, the first search component 139a can identify the application 126 because the application 126 can provide an identifier when providing the search result to the first search component 139a.

At step 336, the first search component 139a can generate a message requesting the identified application 126 to access the application content 129 that corresponds to the selected search result. The first search component 139a can also request the identified application 126 to perform various actions with respect to the application content 129 that corresponds to the selected search result. For example, the first search component 139a can request the identified application 126 to share the application content 129 with another device or to cause a user interface for the identified application 126 to become an active foreground user interface in which the application content 129 is rendered.

Then, at step 339, the first search component 139a can provide the generated message to the identified application 126. For examples in which the identified application 126 is the second application 126b or the third application 126c, the first search component 139a can send the message to the second application 126b or the third application 126c using the interprocess communication service provided by the operating system of the client device 106. For examples in which the identified application 126 is the first application 126a, the first search component 139a can provide the message to the first application 126a without using interprocess communication techniques, because the first search component 139a can be a component of the first application 126a. Thereafter, the process can end.

Figure 4:
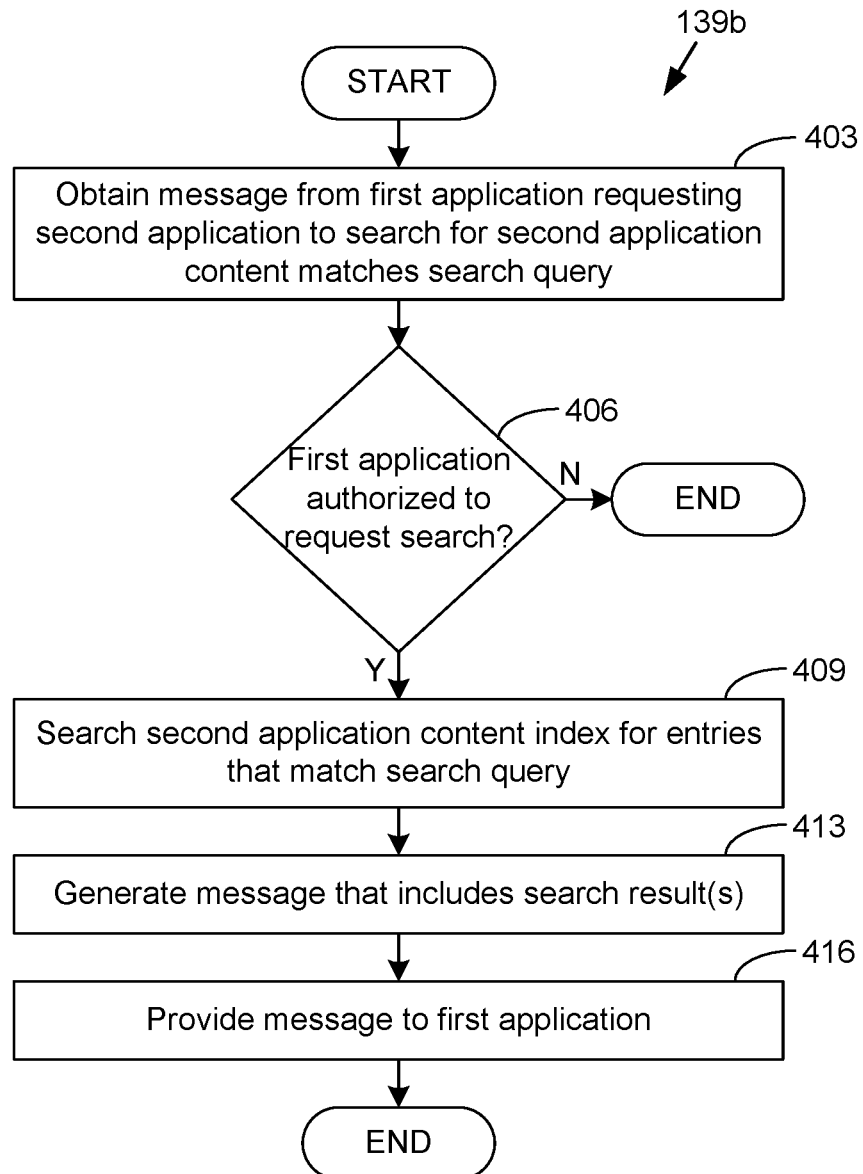

With reference to FIG. 4, shown is a flowchart that provides an example of a portion of the operation of the second search component 139b. In particular, FIG. 4 provides an example of the second search component 139b responding to a request from the first search component 139a to perform a search. It is noted that the first search component 139a and the third search component 139c can operate in a similar manner as the second search component 139b. The flowchart of FIG. 4 can be viewed as depicting an example of a method implemented in the client device 106.

Beginning at step 403, the second search component 139b can obtain a message from the first application 126a requesting the second application 126b to search for second application content 129b that matches a search query. As discussed above, the message can include the search query as well as a communication key that indicates whether the first application 126a is authorized to request the second search component 139b to perform searches.

At step 406, the second search component 139b can determine whether the first application 126a is authorized to request the second search component 139b to perform searches. In some examples, the second search component 139b can compare the communication key contained in the message received at step 403 to a known value to determine whether the first application 126a is authorized to request a search. In other examples, the second search component 139b can maintain a list of applications 126 that are permitted to request searches. In an alternative example, the second search component 139b can communicate with the management service 113, and the management service 113 can specify whether the first application 126a is authorized to request a search.

If the first application 126a is not authorized to request a search, the process can end as shown. Otherwise, if the second search component 139b determines that the first application 126a is authorized to request a search, the second search component 139b can move to step 409 and search the second application content index 136b for entries that match the search query. In other examples, the second search component 139b can search the second application content 129b for resources that match the search query.

After the search, the second search component 139b can generate a message that includes the search results, as shown at step 413. In addition, the message can include information that identifies the second application 126b, and time the search was performed. At step 416, the second search component 139b can provide the generated message to the first application 126a. In some examples, the second search component 139b can use an interprocess communication service provided by the operating system to send the message to the first application 126a. Thereafter, the process can end.

Figure 5:
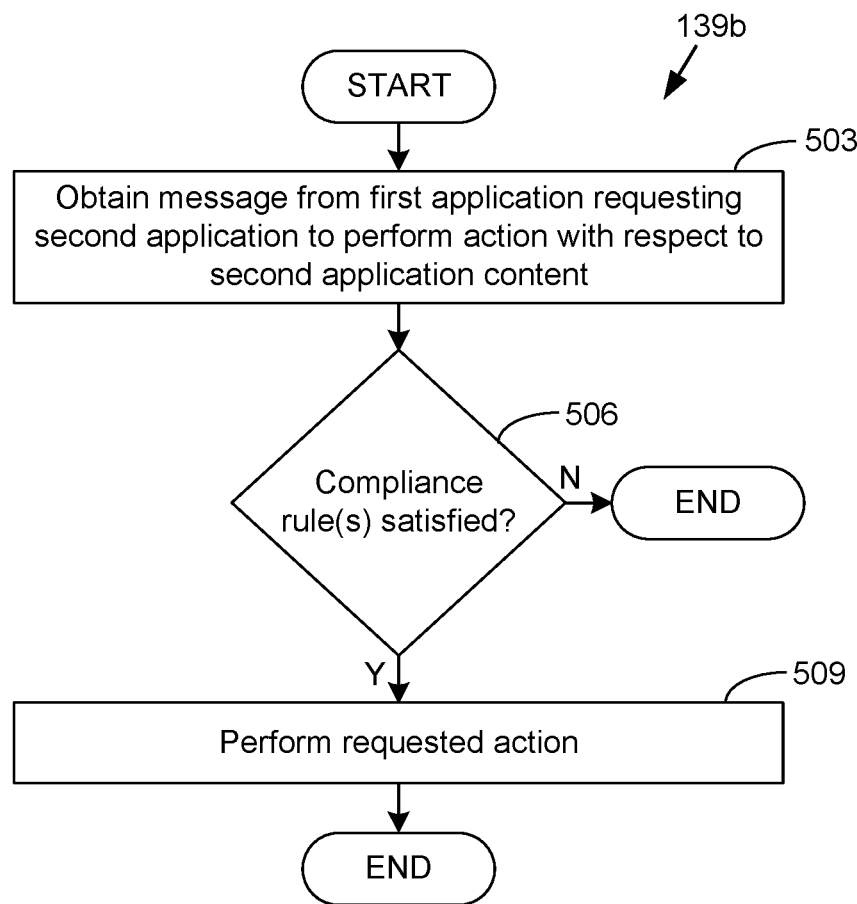

With reference to FIG. 5, shown is a flowchart that provides another example of a portion of the operation of the second search component 139b. In particular, FIG. 5 provides an example of the second search component 139b receiving and processing a request to perform an action with respect to second application content 129b that corresponds to a search result. It is noted that the first search component 139a and the third search component 139c can operate in a similar manner as the second search component 139b. The flowchart of FIG. 5 can be viewed as depicting an example of a method implemented in the client device 106.

Beginning with step 503, the second search component 139b can obtain a message from the first application 126a requesting the second application 126b to perform an action with respect to second application content 129b. The second application content 129b can correspond to a search result that the second search component 139b provided to the first application 126. Examples of requested actions include opening the second application content 129b, sharing the second application content 129b to another application 126 or device, and annotating the second application content 129b At step 506, the second search component 139b can determine whether applicable compliance rules 116 are satisfied so that the second application 126b is permitted to perform the requested action. If the applicable compliance rules 116 are not satisfied, the process can end, as shown. In addition, the second search component 139b can perform a remedial action in response to the compliance rules 116 not being satisfied. For instance, the second search component 139b can notify the user of the client device 106 or an administrator of the management service 113 of the non-compliance. As other examples, the second search component 139b can modify a setting in the client device 106 so that the compliance rules 116 become satisfied.

If the applicable compliance rules 116 are satisfied, the second search component 139b can proceed to step 503 and perform the requested action. For example, the second search component 139b can cause the second application 126b to open the second application content 129b, share the second application content 129b to another application 126 or device, or annotate the second application content 129b, as requested by the first application 126a. Thereafter, the process can end.

The sequence diagrams and flowcharts discussed above show examples of the functionality and operation of implementations of components described herein. The components of the networked environment 100 described herein can be embodied in hardware, software, or a combination of hardware and software. If embodied in software, each step in the sequence diagrams and flowcharts can represent a module or a portion of code that includes computer instructions to implement the specified logical functions. The computer instructions can include source code that comprises human-readable statements written in a programming language or machine code that comprises machine instructions recognizable by a suitable execution system, such as a processor in a computer system. If embodied in hardware, each step can represent a circuit or a number of interconnected circuits that implement the specified logical functions.

Although the sequence diagrams and flowcharts show a specific order of execution, the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid.

The computing environment 103 and client device 106 can include at least one processing circuit. Such a processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, at least portions of the management service 113 and the applications 126 can be stored in one or more storage devices and be executable by one or more processors. Also, the enterprise data store 119 and the client data store 133 can be located in the one or more storage devices.

The management service 113 and the applications 126 can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software and computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A system, comprising:
    a computing device; and
    a storage device storing a first application executed on the computing device, wherein the first application causes the computing device to at least:
        obtain a search query from a first search component of the first application;
        send a request to a second application, the request comprising a first key comprising an indication that the first application is authorized to request search results from the second application;
        obtain a response from the second application, the response comprising a search result from a second search component of the second application based on the request, an indication of an identity of the second application, and a second key comprising an indication that the second application is authorized to communicate with the first application;
        present the search result in a user interface in the first application;
        obtain a selection of the search result presented in the user interface; and
        obtain an indication from the second search component of an action the second application can provide with respect to the search result.

2. The system of claim 1, wherein the first application further causes the computing device to at least:
    remove a third application from a list of applications executed on the computing device in response to receiving a message sent by the third application.

3. The system of claim 1, wherein the first application further causes the computing device to at least:
    search for content associated with the first application that corresponds to the search query;

generate an additional search result based on the search query; and present the additional search result in the user interface.

4. The system of claim 1, wherein the first application further causes the computing device to at least:

broadcast a message to the second application that the first application is being uninstalled.

5. The system of claim 1, wherein the first application further causes the computing device to at least:

notify the second application of a data field that is searchable with respect to the first application.

6. The system of claim 1, wherein the first application incorporates a security library that can be invoked when the first application is executed on the computing device.

7. A non-transitory computer-readable medium storing a first application executed on a computing device, wherein the first application causes the computing device to at least:

obtain a search query from a first search component of the first application;

send a request to a second application, the request comprising a first key comprising an indication that the first application is authorized to request search results from the second application;

obtain a response from the second application, the response comprising a search result from a second search component of the second application based on the request, an indication of an identity of the second application, and a second key comprising an indication that the second application is authorized to communicate with the first application;

present the search result in a user interface in the first application;

obtain a selection of the search result presented in the user interface; and obtain an indication from the second search component of an action the second application can provide with respect to the search result.

8. The non-transitory computer-readable medium of claim 7, wherein the first application further causes the computing device to at least:

remove a third application from a list of applications executed on the computing device in response to receiving a message sent by the third application.

9. The non-transitory computer-readable medium of claim 7, wherein the first application further causes the computing device to at least:

search for content associated with the first application that corresponds to the search query;

generate an additional search result based on the search query; and present the additional search result in the user interface.

10. The non-transitory computer-readable medium of claim 7, wherein the first application further causes the computing device to at least:

broadcast a message to the second application that the first application is being uninstalled.

11. The non-transitory computer-readable medium of claim 7, wherein the first application further causes the computing device to at least:

notify the second application of a data field that is searchable with respect to the first application.

12. The non-transitory computer-readable medium of claim 7, wherein the first application incorporates a security library that can be invoked when the first application is executed on the computing device.

13. A method, comprising:

obtaining, by a first application executed by a computing device, a search query from a first search component of the first application;

sending, by the first application, a request to a second application, the request comprising a first key comprising an indication that the first application is authorized to request search results from the second application;

obtaining, by the first application, a response from the second application, the response comprising a search result from a second search component of the second application based on the request, an indication of an identity of the second application, and a second key comprising an indication that the second application is authorized to communicate with the second application;

presenting the search result in a user interface in the first application;

obtaining, by the first application, a selection of the search result presented in the user interface; and obtaining, by the first application, an indication from the second search component of an action the second application can provide with respect to the search result.

14. The method of claim 13, further comprising:

removing, by the first application, a third application from a list of applications executed on the computing device in response to receiving a message sent by the third application.

15. The method of claim 13, further comprising:

searching, by the first application, for content associated with the first application that corresponds to the search query;

generating, by the first application an additional search result based on the search query; and presenting the additional search result in the user interface.

16. The method of claim 13, further comprising:

broadcasting, by the first application, a message to the second application that the first application is being uninstalled.

17. The method of claim 13, further comprising:

notifying, by the first application, the second application of a data field that is searchable with respect to the first application.

18. The system of claim 1, wherein the first application further causes the computing device to at least:

provide a request to the second application to perform the action with respect to the search result.

19. The non-transitory computer-readable medium of claim 7, wherein the first application further causes the computing device to at least:

provide a request to the second application to perform the action with respect to the search result.

20. The method of claim 13, further comprising:

providing, by the first application, a request to the second application to perform the action with respect to the search result.

* * * * *